(12) United States Patent
Elefant et al.

(10) Patent No.: US 9,578,547 B2
(45) Date of Patent: *Feb. 21, 2017

(54) SYSTEM, DEVICE, AND METHOD OF MEDIA DELIVERY OPTIMIZATION

(71) Applicant: Allot Communications Ltd., Hod-Hasharon (IL)

(72) Inventors: Andrei Elefant, Modiin Maccabim Reut (IL); Amir Hochbaum, Modiin Maccabim Reut (IL); Israel Jay Klein, Kfar Saba (IL); Yaniv Sulkes, Ramat Gan (IL); Asaf Shahar, Kfar Saba (IL)

(73) Assignee: ALLOT COMMUNICATIONS LTD., Hod-Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,450

(22) Filed: Aug. 25, 2015

(65) Prior Publication Data

US 2015/0365847 A1 Dec. 17, 2015

Related U.S. Application Data

(63) Continuation of application No. 13/519,591, filed as application No. PCT/IB2010/056135 on Dec. 30, 2010, now Pat. No. 9,137,700.

(60) Provisional application No. 61/282,220, filed on Dec. 31, 2009.

(51) Int. Cl.
| | |
|---|---|
| *H04W 28/12* | (2009.01) |
| *H04W 28/02* | (2009.01) |
| *H04W 72/10* | (2009.01) |
| *H04W 24/02* | (2009.01) |
| *H04W 28/20* | (2009.01) |

(52) U.S. Cl.
CPC ............ *H04W 28/12* (2013.01); *H04W 28/02* (2013.01); *H04W 28/0284* (2013.01); *H04W 28/0289* (2013.01); *H04W 72/10* (2013.01); *H04W 24/02* (2013.01); *H04W 28/20* (2013.01)

(58) Field of Classification Search
CPC .......... H04L 47/10; H04L 47/15; H04L 47/30; H04L 47/12
See application file for complete search history.

(56) References Cited

U.S. PATENT DOCUMENTS

2005/0041584 A1* 2/2005 Lau ...................... H04L 41/0866
370/235
2008/0117869 A1* 5/2008 Freen ...................... H04W 72/04
370/329

* cited by examiner

*Primary Examiner* — Andrew Lai
*Assistant Examiner* — Zhiren Qin
(74) *Attorney, Agent, or Firm* — Eitan, Mehulal & Sadot

(57) ABSTRACT

A method for alleviation of congestion in a mobile communications network includes detecting congested cells in the mobile communications network, identifying subscribers with active data sessions in the congested cells; and optimizing bandwidth usage for at least one of the identified subscribers. A bandwidth optimization system includes a network sampling interface to receive at least subscriber, cell and data session identifiers from a network data packet sampler, where the sampler identifies the identifiers from internal data traffic within a mobile communications network, and a network awareness engine (NAE) to at least cross reference the identifiers with external data traffic output by the mobile communications network to at least detect congested cells and associated subscriber data sessions emanating from the mobile communications network.

20 Claims, 4 Drawing Sheets

SYSTEM, DEVICE, AND METHOD OF MEDIA DELIVERY OPTIMIZATION

CROSS-REFERENCE TO RELATED APPLICATIONS

This application is a continuation of U.S. patent application Ser. No. 13/519,591, filed on Nov. 14, 2012; which is a national phase of PCT International Application Number PCT/IB2010/056135, filed on Dec. 30, 2010, published as WO 2011/080714, which claims priority and benefit from U.S. Provisional Patent Application No. 61/282,220, filed on Dec. 31, 2009, all of which are hereby incorporated by reference in their entirety.

FIELD OF THE INVENTION

The present invention relates to network congestion generally, and to the optimal usage of bandwidth to alleviate such congestion in particular.

BACKGROUND OF THE INVENTION

"Network congestion" occurs when the demand for bandwidth outstrips the supply. Optimally, a network would have sufficient bandwidth to support any rate of throughput required by its users. However, most networks do not have constant levels of bandwidth usage; aggregate demand for bandwidth typically varies from extreme to extreme in accordance with both cyclic factors as well as random events. It is therefore seldom cost/effective to maintain a level of reserve bandwidth capacity that would be sufficient to address any and all resource demands, in any and all situations. Accordingly, most networks suffer at some time or another from network congestion. As a network becomes congested, its users may typically experience a combination of lengthened response times, increased error rates, dropped connections, etc.

Network congestion does not necessary involve the entire network. A given area may become congested without necessarily impacting on the rest of the network. Such partial, or "local" congestion is generally more likely to occur when the network's resources are statically assigned to a given area and cannot be easily reassigned to compensate for congestion elsewhere.

For example, mobile communications networks, which typically employ "cellular" coverage, are particularly susceptible to local congestion. In such networks, the geographic area served by the mobile network is divided up into cells, and each cell is serviced by a mobile station that provides connectivity to whichever subscribers happen to be in the cell at a given time. Multiple subscribers simultaneously attempting to use the same mobile station can congest a cell, even though the rest of the network may have excess capacity.

The number of subscribers necessary to congest a cell is a function of how many there are and how much bandwidth each requests from the network. Typically, the total bandwidth available to a mobile station in a 3GPP-HSPA network is 7.2 Mbps. A subscriber downloading media content will typically use approximately 400-1000 Kbps in bandwidth. Accordingly, depending on the circumstances and protocol overhead as few as four or five subscribers actively downloading media content can congest a single cell. In fact, when using "misbehaving" peer-to-peer protocols that are optimized to grab as much bandwidth as possible, a single subscriber can use up all of the available bandwidth in a given cell.

A number of media delivery optimization (MDO) methods are used for combating network congestion caused by the downloading of media content. One such method is "transcoding". Transcoding includes reformatting the media content to be downloaded via the network to a different, presumably more efficient encoding technique that requires less bandwidth. For example, a media file identified as being in MPEG2 format may be converted to H264 format which requires less bandwidth for transmission while maintaining more or less the same quality.

Another such method is "transrating" which entails reducing the total media content bit rate by either manipulating the frame rate, and/or reducing the number of frames without changing the encoding technique. Transrating thus effectively reduces the quality of the media stream. However as with transcoding, the extent to which it is used determines whether the reduction in quality is acceptable and/or even perceived by the end user.

"Traffic shaping" is also commonly used to prevent congestion from developing. Traffic shaping entails the enforcement of policies for bandwidth usage. Examples of such policies include: minimum bit rates, maximum bit rates, relative prioritization, etc.

Another congestion reduction method is buffer management or "Time-to-view (TTV) manipulation". TTV manipulation entails matching the download rate via the network to that of the viewing rate (e.g. the streaming rate according to which the media content is ultimately played on the subscriber's communication device). This method is predicated on the fact that many devices are capable of downloading media content faster than they can play it, thus artificially raising the demand for bandwidth while they download, especially in cases where the media content ultimately isn't used in its entirety (e.g., viewing only 10 seconds of a 3 minute video clip while most of it was already "buffered" due to fast a download rate).

Caching is used to reduce the overhead required for repeated delivery of the same media content, often in combination with either transcoding or transrating. A copy of the media content may be cached on the mobile network, thus reducing the necessity of repeated transactions to download it from the source, typically an external content server. When combined with transcoding or transrating, the stored copy may be in altered format thus saving the overhead of reformatting the content for each individual request.

Media link adaptation (MLA) involves a transport protocol in which link conditions (between subscriber and the network) are sensed and used to signal a media content server to change and adapt bit rate accordingly. One example of an MLA is HTTP Live. HTTP Live's protocol calls for participating content servers to maintain multiple versions of the original content in varying sizes and formats. The specific version supplied by the server for download is determined in accordance with the link conditions.

SUMMARY OF THE PRESENT INVENTION

There is provided, in accordance with a preferred embodiment of the present invention, a method for alleviation of congestion in a mobile communications network, the method including detecting congested cells in the mobile communications network, identifying subscribers with active data sessions in the congested cells, and optimizing bandwidth usage for at least one of the identified subscribers.

Further, in accordance with a preferred embodiment of the present invention, the detecting includes receiving cell and data session identifiers from an internal network data packet sampler, inspecting data packets emanating from the mobile communications network to at least determine bandwidth used for each current data session, cross referencing the data session identifiers with each concurrent data session to calculate aggregate bandwidth in use for each cell in the mobile communications network according to associated the cell identifiers, and determining that the cells with the aggregated bandwidth exceeding a predetermined threshold are congested.

Still further, in accordance with a preferred embodiment of the present invention, the identifying includes receiving subscriber identifiers from the internal network data packet sampler, for each congested cell, cross referencing the data session identifiers with each concurrent data session to identify subscribers with active data sessions in the congested cells, and associating their bandwidth usage according to the bandwidth used for each data session.

Additionally, in accordance with a preferred embodiment of the present invention, the inspecting also includes determining a type of application used in the current data session.

Moreover, in accordance with a preferred embodiment of the present invention, the inspecting also includes determining a specific application in use in the current data session.

Further, in accordance with a preferred embodiment of the present invention, the optimizing includes for each the identified subscriber, determining an optimization priority as per a subscriber profile, selecting at least one identified subscriber in each the congested cell for optimization, determining at least one appropriate media delivery optimization (MDO) function at least in accordance with the subscriber profile for each selected identified subscriber, and transmitting a request to the mobile communications network to optimize the bandwidth usage for the selected identified subscriber in accordance with the at least one appropriate MDO function.

Still further, in accordance with a preferred embodiment of the present invention, the appropriate MDO function is at least one of traffic shaping, where policies on user bandwidth are enforced on a per subscriber basis, transcoding, where media encoding used for the current data session is changed to a different encoding format to facilitate a change in bandwidth requirements, transrating, where a total media content bit rate is reduced without changing the media encoding, and caching, where a copy of media content is stored internally to avoid repeated downloads from an external source.

Additionally, in accordance with a preferred embodiment of the present invention, the appropriate MDO function is time-to-view (TTV) manipulation, where delivery rate of media content is regulated to generally match viewing rate on a communications device of the selected identified subscriber, the viewing rate detected during the inspecting.

Moreover, in accordance with a preferred embodiment of the present invention, the appropriate MDO function is media link adaptation (MLA), where a subscriber communications device uses a transport protocol to signal a media content server regarding available bandwidth for downloading particular media content, and the media content server selects and downloads a version of the particular media content in accordance with the available bandwidth.

Further, in accordance with a preferred embodiment of the present invention, the at least one appropriate MDO is a combination of at least two appropriate MDOs.

Still further, in accordance with a preferred embodiment of the present invention, the optimizing also includes transmitting a request to the mobile communications network to stop the optimizing in accordance with the MDO for all associated selected identified subscribers if an associated the cell is no longer congested.

Additionally, in accordance with a preferred embodiment of the present invention, the subscriber profile is stored in a subscriber profile database (SPD), where the SPD contains at least an indication of maximum bandwidth allowed to each subscriber and is periodically updated in accordance with subscriber information stored in the mobile communications network.

Moreover, in accordance with a preferred embodiment of the present invention, the SPD contains at least an indication of at least one MDO to use with each subscriber.

Further, in accordance with a preferred embodiment of the present invention, the indication of at least one MDO is provided for each predetermined level of congestion in the congested cell.

Still further, in accordance with a preferred embodiment of the present invention, the predetermined threshold is stored in a network topology database (NTD), the NTD storing at least one the predetermined threshold for each cell in the mobile communications database.

Additionally, in accordance with a preferred embodiment of the present invention, the determining also includes determining a level of congestion.

Moreover, in accordance with a preferred embodiment of the present invention, the inspecting also includes deep packet inspection (DPI) to detect the bandwidth used and an identifier for the current data session, where the identifier for the current data session is suitable for the cross referencing.

Further, in accordance with a preferred embodiment of the present invention, the DPI detects at least a type of application in use for the current data session.

Still further, in accordance with a preferred embodiment of the present invention, the DPI identifies a specific application in use for the current data session.

There is also provided, in accordance with a preferred embodiment of the present invention, a bandwidth optimization system including a network sampling interface to receive at least subscriber, cell and data session identifiers from a network data packet sampler, where the sampler identifies the identifiers from internal data traffic within a mobile communications network, and a network awareness engine (NAE) to at least cross reference the identifiers with external data traffic output by the mobile communications network to at least detect congested cells and associated subscriber data sessions emanating from the mobile communications network.

Moreover, in accordance with a preferred embodiment of the present invention, the system also includes an SPD to store a subscriber profile for each subscriber of the mobile communications network, where the profile includes at least an indication of a media optimization priority for an associated subscriber.

Further, in accordance with a preferred embodiment of the present invention, the system includes a congestion management engine (CME) to select at least one MDO method to be applied to at least one of the associated subscriber data sessions in accordance with the indication of a media optimization priority.

Still further, in accordance with a preferred embodiment of the present invention, the system includes an NTD to at least store threshold congestion values associated with the cell identifiers.

Additionally, in accordance with a preferred embodiment of the present invention, the system also includes a DPI enabled policy enforcement element capable of analyzing the output network traffic to determine bandwidth used on a per-session basis.

Moreover, in accordance with a preferred embodiment of the present invention, the system also includes a policy control element to provide the MDO method to be applied to the mobile communications network.

Further, in accordance with a preferred embodiment of the present invention, the DPI enabled policy enforcement element is configured to amend subscriber requests for media content in accordance with a subscriber's profile, wherein the subscriber requests are detected in the output network traffic.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
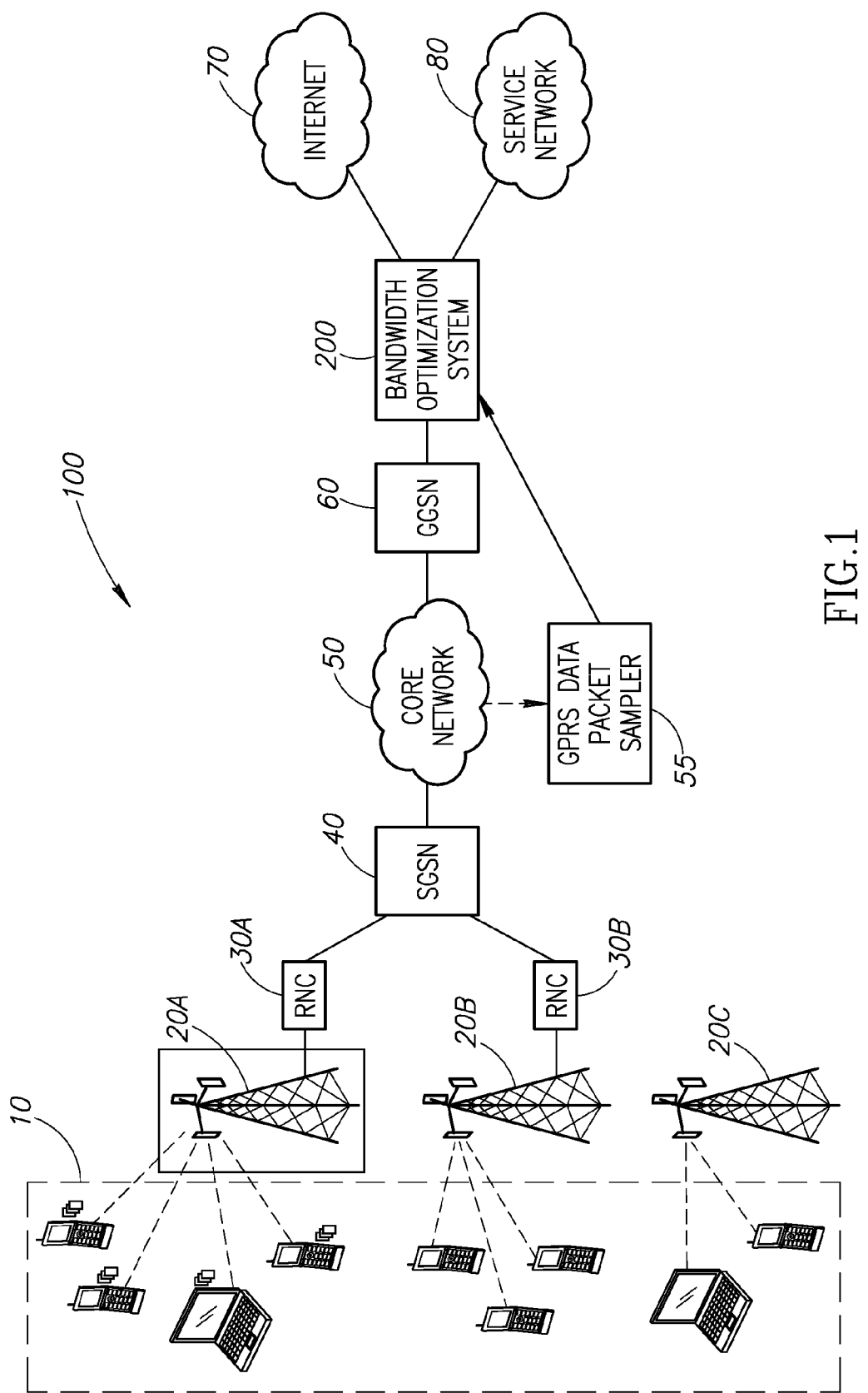
FIG. 1 is a schematic illustration of a novel subscriber level bandwidth optimized mobile data network, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The focus of prior art MDOs for the prevention/reduction of network congestion has largely focused on network-wide solutions. Unfortunately, implementing such methods on such a large scale may be impractical and/or prohibitively expensive. For example, to transcode all of the media content transmitted on a typical mobile network, thousands of digital signal processors (DSPs) would have to be installed and maintained to provide the required processing power. Wide scale transrating may have limited scope—it cannot change the video codec type in use and it may only be used as long as it doesn't significantly impact the perceived quality of media content downloads. Overuse of traffic shaping may suffer from the same issues, and may eventually lead to customer dissatisfaction. Caching and MLA are similarly limited in effective scope: caching is only relevant for frequently used media content, and MLA requires the active participation of third party content servers.

Applicant has realized that MDOs may be more effective if applied on a pinpoint basis, as needed in cells that are congested at the time of application. In such a manner, instead of using the prior art approach of preventing congestion by brute force, only subscribers in cells that are already congested may be subjected to the inconvenience of bandwidth restriction by MDO application.

Applicant has further realized that maximum benefit may be derived from MDOs by using the customer profile of each of the subscribers currently in the congested cell to determine which, if any, of the available MDOs may be applied to optimize the bandwidth requirements of each subscriber separately. For example, the mobile network operator may determine that a business subscriber may be entitled to view high quality videos even during congestion periods, whereas a private subscriber with a family member discount may be restricted to lower quality videos, if at all, during congestion periods.

Reference is now made to FIG. 1, which illustrates a novel subscriber level bandwidth optimized mobile data network 100, constructed and operative in accordance with a preferred exemplary embodiment of the present invention. Network 100 may be a typical 3GPP network and may comprise antennas 20, radio network controllers (RNC) 30, serving GPRS support node (SGSN) 40, core network 50, GPRS data packet sampler 55, gateway GPRS support node (GGSN) 60, and connect with Internet 70 and service network 80. Network 100 may also comprise bandwidth optimizing system (BOS) 200. It will be appreciated that the depiction of network 100 as a 3GPP may be exemplary; the present invention may be implemented within the framework of any mobile or wireless network providing Internet connectability. For example, network 100 may also be an LTE or WIMAX network which may comprise different control elements, such as, for example, SGWs and PGWs, to provide Internet connectability.

Subscriber devices 10 may connect to network 100 via antennas 20. In accordance with an exemplary embodiment of the present invention, the cell served by antenna 20A may be congested. Multiple devices 10 may be connected with antenna 20A, each one of which may be in the process of downloading media content. As discussed hereinabove, four or five devices downloading media contact may be sufficient to cause congestion in the affected cell.

RNCs 30 may control the connections between devices 10 and antennas 20, and send/receive data associated with the connections to/from SGSN 40. It will be appreciated that devices 10 may capable of achieving both voice and data connections with network 100. However, since the primary focus of the MDOs to be applied may be to reduce congestion caused by media content, only network elements with data connection relevance are shown in FIG. 1.

Data associated with devices 10 may be routed through core network 50 by SGSN 40 and GGSN 60. In a typical a GPRS/UMTS network, SGSN 40 and GGSN 60 together facilitate the "tunneling" of the associated data through core network 50 in order to connect devices 10 to Internet 70 and/or service network 80. It will be appreciated that the depiction of network 100 as a GPRS/UMTS network may be exemplary; the present invention may also be configured to work with other technologies, such as, for example, LTE or WIMAX.

When transmitting to Internet 70 or service network 80, GGSN 60 may convert GPRS data packets received from SGSN 40 to packet data protocol (PDP) format appropriate for Internet 70 and/or service network 80. Similarly, when receiving transmissions from Internet 70 or service network 80, it may convert the packets to an internal mobile network packet format, such as, for example, 3GPP format.

It will be appreciated that while in internal mobile network packet format, the packets may include information that may identify the subscriber device and its current cell location, as well details regarding any IP connectivity external to core network 50. Internal format data packet sampler 55 may inspect the data packets and forward the device/location identifiers along with the IP addresses of the associated IP sessions to BOS 200. As will be described hereinbelow, BOS 200 may use this information along with information derived from the PDP formatted packets output by GGSN 60 to determine which cells may be congested, which subscriber devices may be active in the congested cells and what applications may be running on those devices. In accordance with a preferred embodiment of the present invention, sampler 55 may be a RADIUS server. However, it will be appreciated that the present invention may include any suitable utility capable of inspecting internal mobile network data packets and/or maintaining a database of user location information in core network 50.

Figure 2:
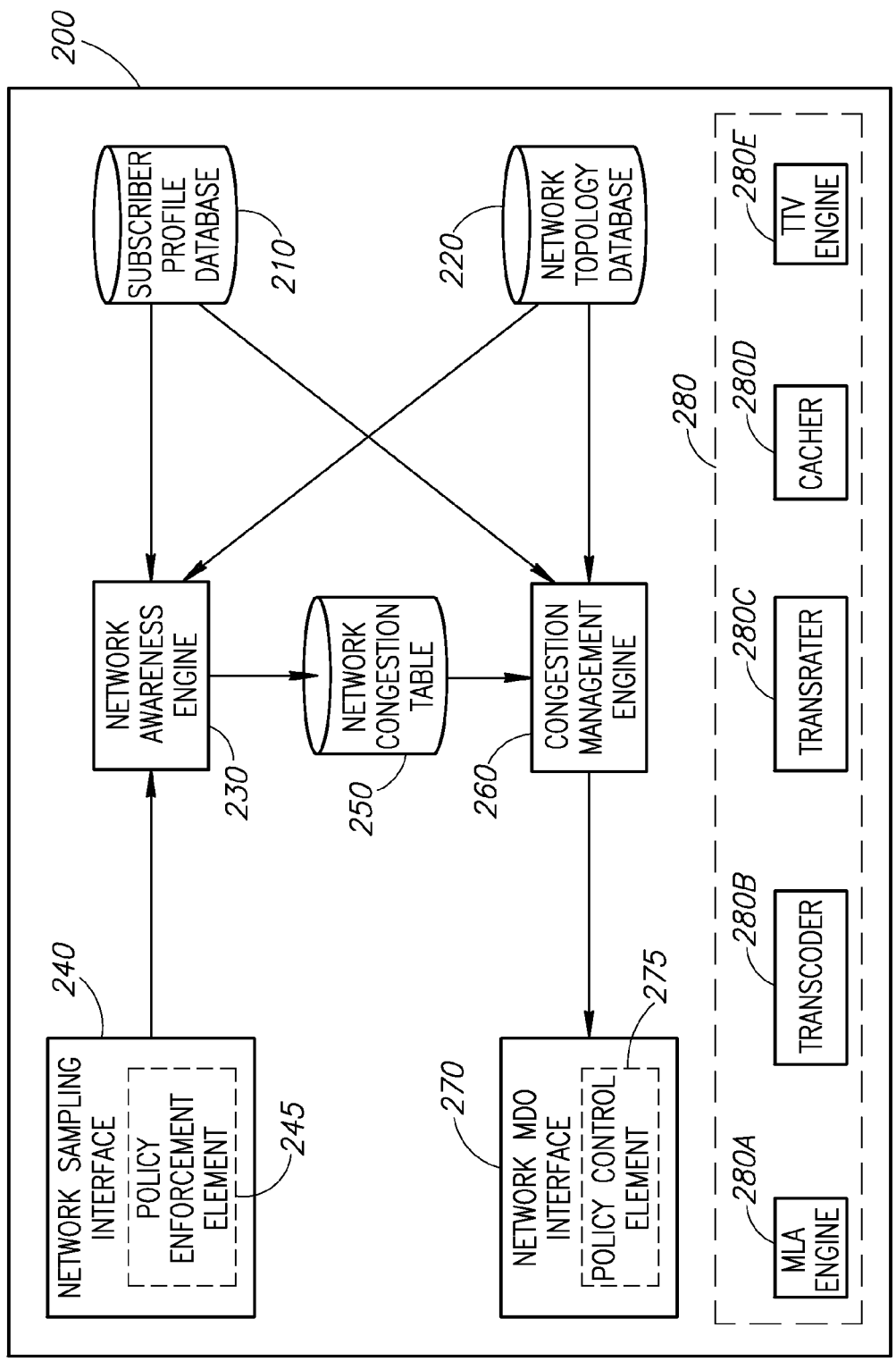
FIG. 2 is a schematic illustration of a novel bandwidth optimization system to be implemented within the framework of the network of FIG. 1.

Reference is now made to FIG. 2 which illustrates a novel BOS 200, constructed and operative in accordance with a preferred embodiment of the present invention. BOS 200 may comprise subscriber profile database (SPD) 210, network topology database (NTD) 220, network awareness engine (NAE) 230, network sampling interface 240, network congestion table (NCT) 250, congestion management engine (CME) 260, Network MDO interface 270 and MDOs 280.

SPD 210 and NTD 220 may provide NAE 230 with generally static reference data that may be used to determine whether or not a cell is suffering from congestion and which subscribers are currently using it. Specifically, SPD 210 may store information that may be used to determine the level of service and particular MDOs to use for a given subscriber in response to a given level of congestion. For example, SPD 210 may store an identifier (i.e. phone number), device type, service plan, optimization procedure and associated network parameters for each subscriber of network 100 (FIG. 1). It will be appreciated that SPD 210 may be created using data from a typical mobile operator customer database, and may be periodically updated as per changes in the customer database. Alternatively, SPD 210 may be defined as a view of existing data in the customer database.

NTD 220 may store reference data that may be used to determine whether or not a given cell may be congested. For example, NTD 220 may store a list of cell sites, their total bandwidth capacities, associated congestion thresholds, and/or maximum number of concurrent users. NAE 230 may compare the data in NTD 220 to actual observed network activity to determine whether or not a given cell may be congested.

From time to time, NAE 230 may receive subscriber/device data from sampler 55 (FIG. 1). NAE 230 may also periodically receive network sampling data via network sampling interface 240. Network sampling interface 240 may invoke policy enforcement (PE) element 245 to acquire the network sampling data. PE element 245 may comprise functionality for inspecting IP packets and determining the application for which they may be intended. For example, PE element 245 may inspect IP packets transmitted by GGSN 60 (FIG. 1) and determine that they belong to a VOIP application. As will be discussed in detail hereinbelow, NAE 230 may cross reference the results of this determination along with reference data from SPD 210 and NTD 220 and the subscriber/device data received from sampler 55 to generate network congestion table 250.

PCT patent application PCT/IL08/000829, entitled "A DPI MATRIX ALLOCATOR" and filed Jun. 18, 2008, which is assigned to the common assignees of the present invention and hereby incorporated in its entirety by reference, discloses a system and method for deep packet inspection. In accordance with a preferred embodiment of the present invention, the functionality for PE element 245 may be provided by the system and method for DPI as disclosed in PCT patent application PCT/IL08/000829. However, it will be appreciated that the present invention may include any suitable functionality that may be capable of determining the required information from an IP packet.

CME 260 may periodically review network congestion table to identify subscriber connections to be optimized from among those associated with congested cells. CME 260 may select subscribers for optimization based on their profiles as represented in SPD 210. In general, as described hereinbelow, a subscriber's feature plan may indicate its priority when CME 260 selects subscriber connections for optimization. The higher a subscriber's priority, the less likely it may be that its connection may be optimized by CME 260.

It will be appreciated that traffic shaping, as described hereinabove, may be a built-in feature of CME 260, implemented in conjunction with the subscriber's profile in SPD 210. CME 260 may apply traffic shaping and/or associate one or more MDOs 280 with a given subscriber connection. In accordance with a preferred embodiment of the present invention, MDOs 280 may include one or more of MLA engine 280A, transcoder 280B, transrater 280C, Cacher 280D and TTV engine 280E. It will be appreciated that the present invention may include any other suitable MDO as well.

PC element 275 may be a control agent that may be authorized to provide instructions to core network 50 regarding subscribers' connections. CME 260 may use PC element 275 via network MDO interface 270 to implement optimization procedures on selected subscriber connections.

It will be appreciated that the depiction of BOS 200 as a single entity may be exemplary. The present invention may also include embodiments in which the functionality provided by BOS 200 may be provided by two or more servers accessing either internal or external databases.

Figure 3:
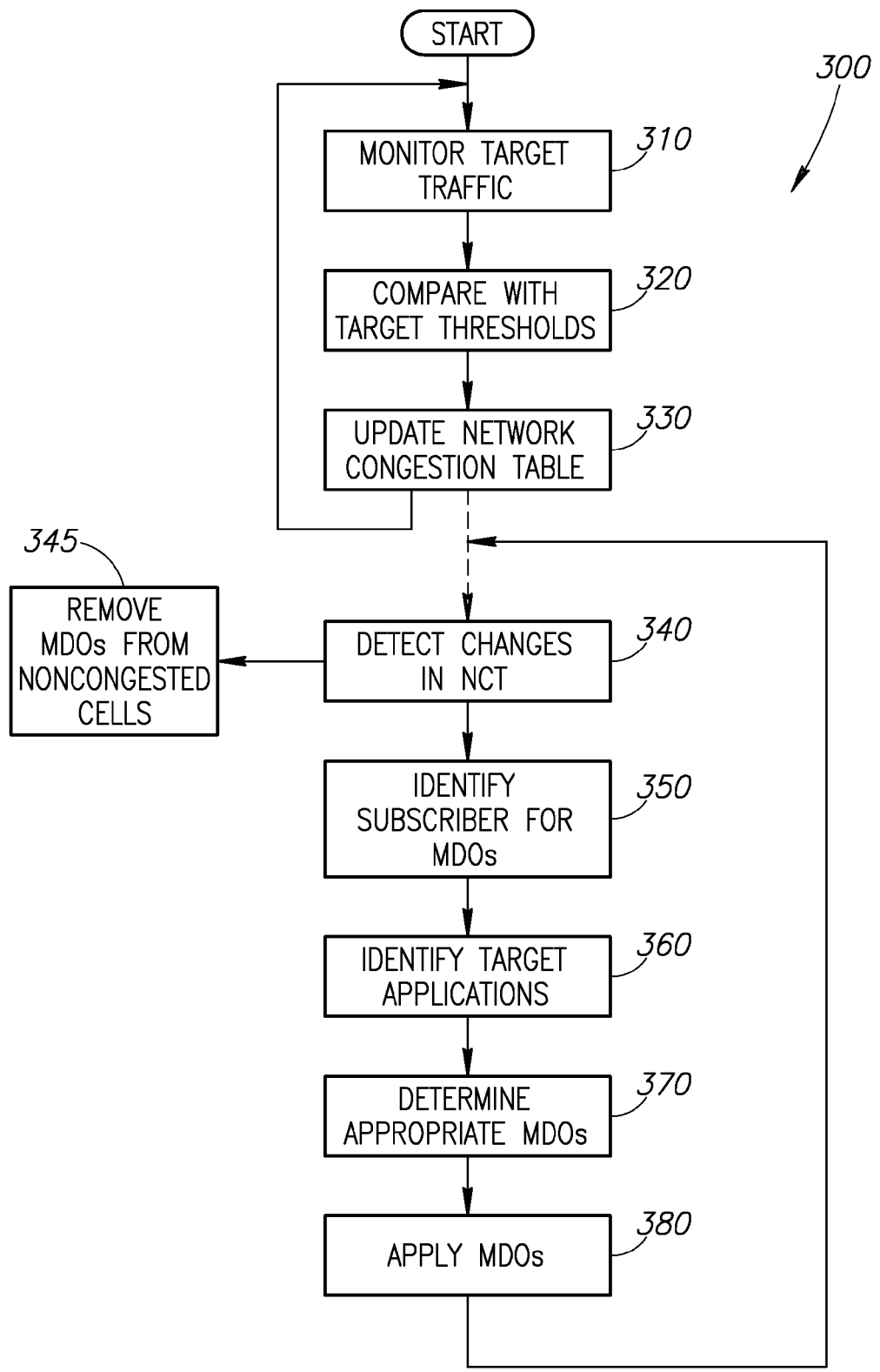
FIG. 3 is a block diagram of a novel congestion detection and reduction process 300, operative in accordance with a preferred embodiment of the present invention, to be executed by the system of FIG. 2.

Reference is now made to FIG. 3 which illustrates a novel congestion detection and reduction process 300, operative in accordance with a preferred embodiment of the present invention. In accordance with a preferred embodiment of the present invention, process 300 may be executed on a repeating basis by BOS 200.

NAE 230 may invoke PE element 245 to monitor (step 310) data transmissions transmitted between GGSN and Internet 70 and/or service network 80. It will be appreciated that NEA 230 may not be located within core network 50, but rather may inspect its data traffic after it has been converted to a standard IP format. PE element 245 may provide NAE 230 with details regarding the data transmissions, including, for example, relevant IP addresses, bandwidth requirements/usage, and the type of data being transmitted. In some cases, PE element 245 may even diagnose which specific application may be running.

NAE 230 may cross reference the IP addresses provided by PE element 245 with those provided by data packet sampler 55 (FIG. 1) to map each sampled transmission to a specific subscriber/cell. In accordance with a preferred embodiment of the present invention, sampler 55 may be a Radius server. However, it will be appreciated that any product or service providing the required level of packet inspection functionality may also be included in the present invention.

It will be appreciated that data packet sampler 55 (FIG. 1) may process only a percentage of the actual data traffic in network 50. However, Applicant has realized that network congestion may typically be caused by data connections lasting for at least several minutes; shorter connections may tend to use significantly less aggregate bandwidth and are accordingly less significant when approximating congestion levels. Applicant has also realized that most "power users" that make frequent heavy use of data connections in a mobile environment make typically do so from a static location. Accordingly, even though periodic sampling by sampler 55 may theoretically miss a user that may move from cell to cell, the overall effect may be minimal.

Figure 4:
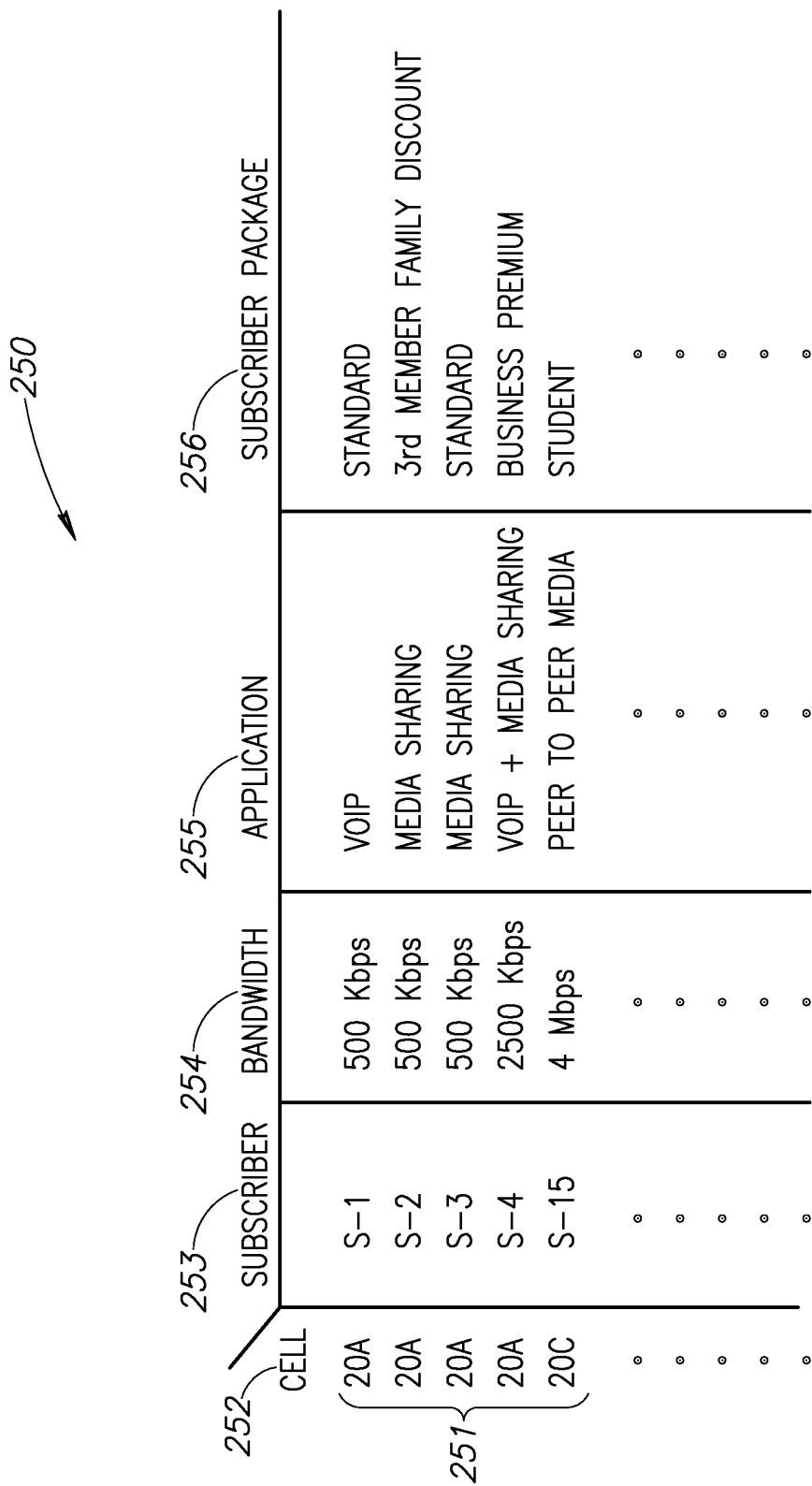
FIG. 4 is a schematic illustration of an exemplary network congestion table, constructed and operative in accordance with a preferred embodiment of the present invention.

NAE 230 may then compare (step 320) the aggregate usage for subscribers in the same cell with target bandwidth thresholds for each of the cells as read from NTD 220. Cells that have exceeded their targets may be congested. NAE 230 may update (330) network congestion table 250 to reflect the results of step 320. In accordance with a preferred exemplary embodiment of the present invention, each subscriber/device may be assigned a row in table 250, such that each cell may have several entries. FIG. 4, to which reference is now also made, may represent an exemplary network congestion table 250, constructed and operative in accordance with a preferred embodiment of the present invention.

Each of rows 251 may represent a subscriber (column 253) in a particular congested cell (column 252). For example, the first row 251 in table 250 may represent subscriber S-1 in cell 20A. The value in column 254 may represent the bandwidth used by subscriber S-1, and the entry in column 255 may represent the application in use by subscriber S-1 as per a diagnostic run by PE element 245. It will be appreciated that table 250 that rows 251 may represent data only for congested cells; non-congested cells may not be represented in table 250.

In accordance with an exemplary embodiment of the present invention, table 250 may also be updated with details of each subscriber's profile that may affect their "bandwidth entitlement", such as, for example, an indication of subscriber package as listed in column 256. Depending on its configuration, table 250 may also include other relevant information such as customer type, added features, etc. Alternatively, the profile details may be looked up as needed from SPD 210 using the subscriber identifier from column 252. It will be appreciated that the representation of subscriber identifiers in table 250 may be exemplary; in actual production subscriber telephone numbers may typically be used. After updating table 250, NAE 230 may repeat the process by returning to step 310.

In parallel to the repeated updating of table 250 by NAE 230, CME may detect (step 340) changes in table 250. For example, as shown in FIG. 4, table 250 may indicate that cell 20A (FIG. 1) may currently be currently congested by its four subscribers with data connections. Three of the subscribers may be using 500 Kbps, and the fourth 2.5 Mbps. The aggregate bandwidth in use for cell 20A (i.e. 4 Mbps) may cross a threshold for congestion as defined in NTD 220.

For every cell that may be defined as congested, CME 260 may identify (step 350) which of the cell's subscriber connections should be optimized. In general, the decision whether to optimize a given connections may be a function of the bandwidth in use and the subscriber's profile. In the exemplary representation of FIG. 4, subscriber S-4 may be using the most bandwidth. However, the terms of its "business premium" subscriber package may grant S-4 higher priority for bandwidth usage. In such a case, CME may then determine which of the other connections may be optimized instead. S-1, S-2 and S-3 may all be using the same bandwidth, but the "standard" subscriber package may be entitled to higher priority than "$3^{rd}$ member family discount". Accordingly, the connection for subscriber S-2 may be identified for optimization.

CME 260 may also identify (step 360) the target application to be optimized. For example, S-2 may be running a media sharing application such as, for example, YouTube, while S-1 may be using a VOIP application, such as, for example, Skype. It will be appreciated that some MDOs 280 (FIG. 2) may be more appropriate for some applications than others. For example, Cacher 280D may be appropriate for caching frequently downloaded media files, yet inappropriate for VOIP applications. Accordingly, CME 260 may identify the target applications in use prior to determining which MDO 280 to use for optimization.

CME 260 may also use the target application when determining which subscriber connection to optimize. For example, as shown in FIG. 4, S-1 may be using a voice application and have a "standard" subscriber package. The standard subscriber package may place lower priority on VOIP than on media sharing. In such a case, CME 260 may identify (step 350) S-1 for optimization instead of S-2 as in the previous embodiment. It will be appreciated that the business logic for determining which, if any, subscriber connections to optimize, may be configurable; the present invention may include any suitable logic that may be predicated on analysis of the subscriber's profile to make such a determination. It will similarly be appreciated that such configuration may include changing the order of steps 350 and 360 and/or executing them iteratively.

CME 260 may also be configured with business logic to determine (370) the appropriate MDO 280 (or combination of MDOs 280) to use for each subscriber connection to be optimized. For example, TTV engine 280E may be irrelevant for VOIP applications that may not make significant use of buffers, such applications may be optimized more efficiently using transrater 280C. Cacher 280D may only be appropriate for frequently downloaded media files. Transcoder 280B may require more processing power than other MDOs 280 and its use may accordingly be restricted as a function of how the overall level of congestion in network 50. MLA engine 280A may require previous agreement with the subscriber and/or the media provider. Once determined, CME 260 may apply (step 380) the appropriate MDO (s) 280 by invoking PC element 275 via network MDO interface 270.

In accordance with a preferred embodiment of the present invention, a subscriber's profile in SPD 210 may indicate that the subscriber's data connections may be optimized using MLA engine 280A. If the subscriber has a data connection in a congested cell, CME 260 may check that the application is suitable for MLA optimization, i.e. that it is a media content application using a media content server that may be configured to support MLA optimization. Based on the specific cell's load and its capacity, PC element 275 may be invoked to provide new traffic shaping restrictions to mobile network 50, including, for example, a new maximum bit rate.

The subscriber device may in time sense the change in its allotted bandwidth. In response, it may signal the MLA enabled media server to which it is connected that its bandwidth may have changed. It will be appreciated that such a signal may be included as part of a protocol for downloading media content from an MLA enabled media server. Upon receipt of such a signal, the media server may adjust its content delivery method accordingly.

It will be appreciated that, as described hereinabove, MLA engine 280A may not directly contact the MLA enabled media server to trigger a change in the content delivery method. Instead, MLA engine 280A may indirectly trigger such a change by affecting the delivery environment; the subscriber device and media server may actually negotiate the required adaptation in light of currently available bandwidth.

However, in accordance with another preferred embodiment of the present invention, MLA engine 280A may also be configured to directly trigger such a change in content delivery method. For example, high definition (HD) media content may generally require more bandwidth to download and view. A subscriber profile in SPD 210 may indicate that the subscriber may not be entitled to view HD media content. The subscriber may be restricted from downloading HD media content depending on current cell congestion levels, or alternatively the restriction may even apply at all levels of congestion.

It will be appreciated that if the subscriber attempts to request an HD media content download, PE element 245 may detect the request while monitoring (FIG. 3, step 310) outgoing data traffic from the subscriber. In accordance with a preferred embodiment of the present invention, PE element 245 may be configured to intercept such a request, and amend it to indicate a request for a non-HD format. MLA engine 280A may invoke PE element 245 to do so in accordance with a subscriber's profile.

It will be appreciated, that over time, congestion may subside in previously congested cells. In such cases, NAE 230 may update network congestion table 250 by deleting the associated cell/subscriber rows. CME 260 may detect such deletions in step 340 and remove (step 245) any MDOs assigned to the associated cells.

It will also be appreciated that BOS 200 may be configured to detect/recognize multiple levels of congestion and to apply different MDOs 280 (or different combinations of MDOs 280) depending on the level of congestion. For example, for cell 20A aggregate usage of of 3.5 Mbps may be "level 1" congested; 3.75 Mbps may be "level 2"; and 4 Mbps may be "level 3". Accordingly, in addition to factoring in cell and subscriber information, CME 260 may also consider congestion level when applying MDOs. For example, for the same cell/subscriber, CME 260 may apply transcoder 280B for congestion level 1, and transrater 280C for levels 2 and 3.

In accordance with a preferred embodiment of the present invention, network congestion table 250 may be implemented with a GUI interface to provide a real time presentation of the state of congestion in mobile network 50. The rows and/or columns of table 250 may be color coded to indicate the severity, nature and/or causes of congested cells.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for alleviation of congestion in a mobile communications network which comprises a cellular core network, the method comprising:
    (a) detecting congested cells in said core cellular network;
    (b) sampling and analyzing packets, that are in internal mobile network packet format, at an internal format data packet sampler that is connected to said core cellular network at a location between a service support node of said core cellular network and a gateway support node of said core cellular network;
    (c) based on said sampling and analyzing of said packets that are in internal mobile network packet format, and based on analysis of other data packets that are in packet data protocol (PDP) format and are outputted by said gateway support node, identifying subscribers with active data sessions in said congested cells; and
    (d) optimizing bandwidth usage for a particular subscriber of said identified subscribers.

2. The method of claim 1, wherein said detecting comprises:
   receiving cell and data session identifiers from an internal network data packet sampler;
   inspecting data packets emanating from said mobile communications network to at least determine bandwidth used for each current data session;
   cross referencing said data session identifiers with said each concurrent data session to calculate aggregate bandwidth in use for each cell in said mobile communications network according to associated said cell identifiers; and
   determining that said cells with said aggregated bandwidth exceeding a predetermined threshold are congested.

3. The method of claim 2, wherein said identifying comprises:
   receiving subscriber identifiers from said internal network data packet sampler;
   for each said congested cell, cross referencing said data session identifiers with said each concurrent data session to identify subscribers with active data sessions in said congested cells; and
   associating their said bandwidth usage according to said bandwidth used for each data session.

4. The method of claim 1, wherein said optimizing comprises:
   for each said identified subscriber, determining an optimization priority as per a subscriber profile;
   selecting at least one said identified subscriber in each said congested cell for optimization;
   determining at least one appropriate media delivery optimization (MDO) function at least in accordance with said subscriber profile for each said selected identified subscriber; and
   transmitting a request to said mobile communications network to optimize said bandwidth usage for said selected identified subscriber in accordance with said at least one appropriate MDO function.

5. The method of claim 4, wherein said appropriate MDO function is at least one of:
   traffic shaping, wherein policies on user bandwidth are enforced on a per subscriber basis;
   transcoding, wherein media encoding used for said current data session is changed to a different encoding format to facilitate a change in bandwidth requirements;
   transrating, wherein a total media content bit rate is reduced without changing said media encoding;
   caching, wherein a copy of media content is stored internally to avoid repeated downloads from an external source.

6. The method of claim 4, wherein said appropriate MDO function is time-to-view (TTV) manipulation,
   wherein delivery rate of media content is regulated to generally match viewing rate on a communications device of said selected identified subscriber, said viewing rate detected during said inspecting.

7. The method of claim 4, wherein said appropriate MDO function is media link adaptation (MLA);
   wherein a subscriber communications device uses a transport protocol to signal a media content server regarding available bandwidth for downloading particular media content, and said media content server selects and downloads a version of said particular media content in accordance with said available bandwidth.

8. The method of claim 4, wherein said at least one appropriate MDO is a combination of at least two appropriate MDOs.

9. The method of claim 4, wherein said optimizing comprises:
   transmitting a request to said mobile communications network to stop said optimizing in accordance with said MDO for all associated selected identified subscribers if an associated said cell is no longer congested.

10. The method of claim 2, wherein said predetermined threshold is stored in a network topology database (NTD); wherein said NTD stores at least one said predetermined threshold for each said cell in said mobile communications network.

11. The method of claim 2, wherein said inspecting comprises:
    performing deep packet inspection (DPI) to detect said bandwidth used and an identifier for said current data session, wherein said identifier for said current data session is used for said cross referencing.

12. The method of claim 1, wherein identifying subscribers with active data sessions in said congested cells comprises:
    (A) receiving network sampling data from a network sampling interface by invoking a policy enforcement element to acquire network sampling data from an Internet Protocol network external to said cellular core network;
    (B) performing Deep Packet Inspection (DPI) on IP packets that are transmitted by said gateway support node;
    (C) based on said DPI of said IP packets, determining whether or not said IP packets belong to a particular application running on said cellular device of said particular subscriber;
    (D) receiving subscriber data and device data from said internal format data packet sampler;
    (E) generating a network congestion table by cross-referencing the results of the determining of step (C), with said subscriber data and device data obtained from said internal format data packet sampler in step (D).

13. The method of claim 1, comprising:
    (A) at a Policy Enforcement (PE) element that is external to said cellular core network, monitoring data transmissions of Internet Protocol (IP) packets that are transmitted between the gateway supporting node and the Internet;
    (B) at said PE element that is external to said cellular core network, monitoring data transmissions of IP packets that are transmitted between the gateway supporting node and a service network that is external to the cellular core network;
    (C) based on the monitoring of step (A) and the monitoring of step (B), obtaining:
        (a) IP addresses associated with said data transmissions of IP packets,
        (b) bandwidth requirements of said data transmissions of said IP packets,
        (c) actual bandwidth usage of said data transmissions of said IP packets,
        (d) a type of data being transmitted in each of said data transmissions of said IP packets, and
        (e) a specific application that is running in each of said data transmissions of IP packets;
    (D) cross-referencing the obtained IP addresses received from said PE element, with IP addresses provided by the internal format data packet sampler, wherein the cross-referencing comprises mapping each sampled transmission to a specific subscriber device and a specific cell.

14. The method of claim 1, wherein optimizing bandwidth usage comprises:
(A) by periodically analyzing said network congestion table, identifying subscriber connections to be optimized from among subscribers that are associated with a congested cell;
(B) selecting a particular subscriber for optimization based on a subscriber profile associated with said subscriber and stored in a Subscriber Profile Database (SPD);
wherein the selecting takes into account, at least, a subscriber features plan of said particular subscriber which may indicates a level of priority of said subscriber;
wherein the selecting avoids optimization of mobile connections of high-priority subscribers.

15. The method of claim 1, wherein optimizing bandwidth usage comprises:
(A) based on DPI analysis, determining that a first subscriber device is using a media sharing application;
(B) based on DPI analysis, determining that a second subscriber device is using a Voice over Internet Protocol (VoIP) application;
(C) based on said two determining steps, selectively applying a first Media Delivery Optimization (MDO) function to a communication session of the first subscriber device, and selectively applying a second, different, MDO function to a communication second of the second subscriber device.

16. The method of claim 1, wherein optimizing bandwidth usage comprises:
(A) based on DPI analysis, determining that a first subscriber device is using a media sharing application;
(B) based on DPI analysis, determining that a second subscriber device is using a Voice over Internet Protocol (VoIP) application;
(C) based on said two determining steps, selectively applying a caching function as a first Media Delivery Optimization (MDO) function only to a communication session of the first subscriber device and not to a communication session of the second subscriber device.

17. The method of claim 1, wherein optimizing bandwidth usage comprises:
for a group of three-or-more subscriber devices, that are each determined to utilize high bandwidth in a congested cell, performing:
(A) determining that a first subscriber device of said group is associated with a premium subscriber account, and determining not to apply any Media Delivery Optimization (MDO) function to a communication session of said first subscriber device;
(B) determining that a second subscriber device is associated with a non-discounted subscriber account, determining that the third subscriber account is associated with a discounted subscriber account, and selectively applying an MDO function only to the communication session of the third subscriber account and not to a communication session of the second subscriber account.

18. The method of claim 1, wherein optimizing bandwidth usage comprises:
(A) based on DPI analysis, determining that a particular subscriber device is using a Voice over Internet Protocol (VoIP) application which does not utilize buffers;
(B) based on said determining, selecting not to activate towards said particular subscriber device a time-to-view manipulation MDO function, and selecting to activate towards said particular subscriber device another MDO function.

19. The method of claim 1, wherein optimizing bandwidth usage comprises:
(A) based on DPI analysis, determining that a particular subscriber device is using a particular application;
(B) determining that bandwidth for said particular application is optimize-able if a transcoding MDO function is applied;
(C) determining not to apply said transcoding MDO function to said particular subscriber device by taking into account a processing power restriction of the congested cell and by taking into account an overall level of congestion in said cellular core network.

20. A system comprising:
(I) a Bandwidth Optimization System (BOS) for alleviation of congestion in a mobile communications network which comprises a cellular core network;
wherein said BOS is to detect congested cells in said cellular core network;
(II) an internal format data packet sampler that is connected to said core cellular network at a location between a service support node of said core cellular network and a gateway support node of said core cellular network;
wherein said internal format data packet sampler is to sample and analyze packets that are in internal mobile network packet format;
wherein, based on sampling and analyzing of said packets that are in internal mobile network packet format, and based on analysis of other data packets that are in packet data protocol (PDP) format and are outputted by said gateway support node, the BOS is to identify subscribers with active data sessions in said congested cells;
(III) a Congestion Management Engine (CME) to optimize bandwidth usage for a particular subscriber of said identified subscriber,
wherein at least one of: the BOS, the internal format data packet sampler, and the CME, is implemented by utilizing at least a hardware component.

* * * * *